United States Patent
Hegde

(10) Patent No.: US 10,582,119 B2
(45) Date of Patent: Mar. 3, 2020

(54) IMAGE PROCESSING METHOD AND DEVICE FOR COMPOSITE SELFIE IMAGE COMPOSITION FOR REMOTE USERS

(71) Applicant: SONY CORPORATION, Tokyo (JP)

(72) Inventor: Vedant B Hegde, Bangalore (IN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/659,933

(22) Filed: Jul. 26, 2017

(65) Prior Publication Data
US 2019/0037135 A1    Jan. 31, 2019

(51) Int. Cl.
| | |
|---|---|
| *H04N 5/272* | (2006.01) |
| *H04N 5/232* | (2006.01) |
| *G06T 7/194* | (2017.01) |
| *G06K 9/00* | (2006.01) |
| *G06T 11/60* | (2006.01) |
| *G06K 9/42* | (2006.01) |

(52) U.S. Cl.
CPC ..... *H04N 5/23229* (2013.01); *G06K 9/00228* (2013.01); *G06K 9/00302* (2013.01); *G06K 9/42* (2013.01); *G06T 7/194* (2017.01); *G06T 11/60* (2013.01); *H04N 5/23293* (2013.01); *H04N 5/232935* (2018.08); *H04N 5/272* (2013.01); *G06T 2200/24* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 2005/0036044 A1* | 2/2005 | Funakura | ........... | G06K 9/00228 348/239 |
| 2007/0146798 A1* | 6/2007 | Eto | ..................... | H04N 1/00132 358/302 |

(Continued)

FOREIGN PATENT DOCUMENTS

WO    2015100723 A1    7/2015

OTHER PUBLICATIONS

Picpal, the First Selfie Collage App Launches, PR Newswire, http://www.prnewswire.com/news-releases/picpal-the-first-selfie-collage-app-launches-300132235.html, Aug. 25, 2015, pp. 03.

*Primary Examiner* — Twyler L Haskins
*Assistant Examiner* — Wesley J Chiu
(74) *Attorney, Agent, or Firm* — Chip Law Group

(57) ABSTRACT

A device and method for composite selfie image composition for remote users, includes a first image-capture device that communicates a first notification message to a second image-capture device associated with a second user. The first notification message includes a request to capture a second self-portrait image of the second user, a user-identifier of a first user associated with the first image-capture device and first face coordinates of the first user. The second self-portrait image and second face coordinates of the second user is received from the second image-capture device. By face normalization on a portion of the second self-portrait image, a second face size of the second user is adjusted in accordance with a first face size in a first self-portrait image of the first user. A first output image, for example, a composite selfie, is generated based on at least the face normalization.

14 Claims, 13 Drawing Sheets

(56) References Cited

U.S. PATENT DOCUMENTS

| | | | | |
|---|---|---|---|---|
| 2008/0174680 A1* | 7/2008 | Ogino | ............... | G11B 27/034 |
| | | | | 348/231.99 |
| 2010/0079613 A1* | 4/2010 | Karimoto | ........... | G06K 9/00261 |
| | | | | 348/222.1 |
| 2010/0171807 A1* | 7/2010 | Tysso | ................... | H04N 7/147 |
| | | | | 348/14.09 |
| 2011/0050901 A1* | 3/2011 | Oya | ..................... | H04N 7/183 |
| | | | | 348/143 |
| 2012/0105676 A1* | 5/2012 | Park | ................... | H04N 5/23219 |
| | | | | 348/231.3 |
| 2012/0120273 A1* | 5/2012 | Amagai | ............. | H04N 5/23203 |
| | | | | 348/222.1 |
| 2012/0218431 A1* | 8/2012 | Matsuoto | ............. | H04N 5/2258 |
| | | | | 348/218.1 |
| 2014/0267546 A1* | 9/2014 | Kwon | ................... | H04N 7/142 |
| | | | | 348/14.02 |
| 2016/0093020 A1 | 3/2016 | Basalamah et al. | | |
| 2016/0253552 A1* | 9/2016 | Rihn | ................. | G06K 9/00302 |
| | | | | 382/224 |
| 2017/0140214 A1* | 5/2017 | Matas | ................ | G06K 9/00315 |
| 2019/0208165 A1* | 7/2019 | Ahn | ................... | G06F 3/04817 |

\* cited by examiner

IMAGE PROCESSING METHOD AND DEVICE FOR COMPOSITE SELFIE IMAGE COMPOSITION FOR REMOTE USERS

CROSS-REFERENCE TO RELATED APPLICATIONS/INCORPORATION BY REFERENCE

None.

FIELD

Various embodiments of the disclosure relate to image capture and image processing technologies. More specifically, various embodiments of the disclosure relate to an image processing method and device for composite selfie image composition for remote users.

BACKGROUND

In certain scenarios, a user may capture a self-portrait image (also referred to as a "selfie") in a certain location. The user may also want friends, family members, or other users who may not be present in that location, to be a part of the self-portrait image. In the process of taking the "selfie", if the captured image (i.e. the self-portrait image) consists of two or more users) then such captured image may also referred to as the "usie". The "usie" may also be referred to as a "collective selfie", a "composite selfie", a "selfie of a group", or simply a "group-selfie". Existing image processing and editing techniques enable editing or merging of different images into one image. However, the resulting self-portrait image (for example, the "usie") looks artificial and contains artifacts that are visually unpleasant to a viewer. Therefore, an advanced image processing system may be desirable for composite selfie image composition for remote users.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image processing method and device for composite selfie image composition for remote users, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1A:
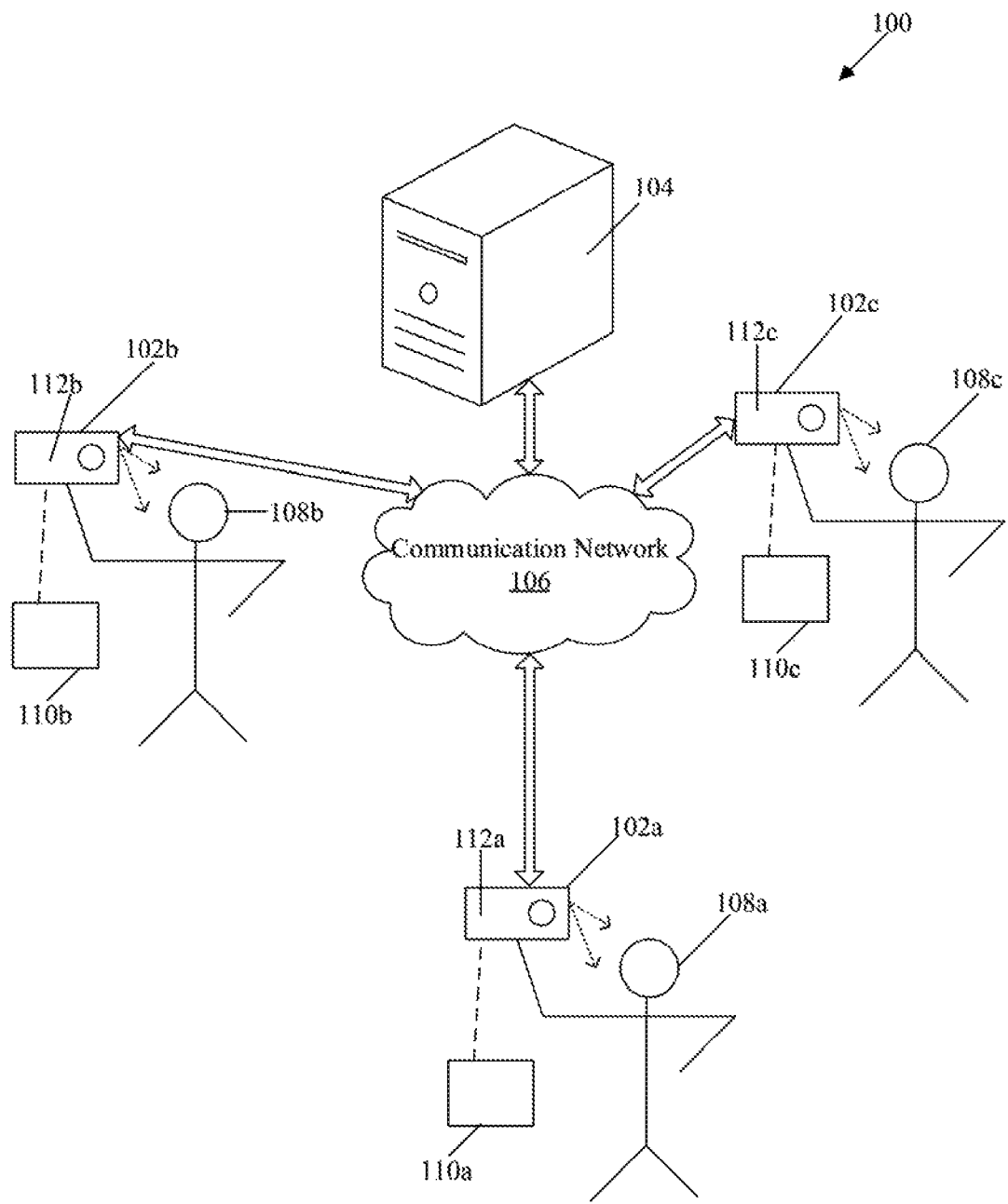
FIG. 1A is a block diagram that illustrates an exemplary network environment for composite selfie image composition for remote users, in accordance with an embodiment of the disclosure.

The following described implementations may be found in the disclosed image processing method and device for composite selfie image composition for remote users. Exemplary aspects of the disclosure may include an image-capture device that comprise a memory configured to store a first self-portrait image of a first user associated with the first image-capture device along with first face coordinates of the first user. The first self-portrait image may include a selected or a default background. The image-capture device may also include an image processor configured to communicate a first notification message to a second image-capture device associated with a second user. The first notification message may include a request to capture a second self-portrait image of the second user, a user-identifier of a first user and the first face coordinates of the first user. The image processor may be configured to receive the second self-portrait image and second face coordinates of the second user from the second image-capture device based on the communicated first notification message. The image processor may be further configured to adjust, by face normalization on a portion of the second self-portrait image, a second face size of the second user in accordance with a first face size of the first user. The adjustment by face normalization may be done based on the first face coordinates and the second face coordinates. The image processor may be further configured to generate a first output image in which the portion of the second self-portrait image may be overlaid on a background region of the selected background of the first self-portrait image of the first user in a first image composition. The first output image may be generated based on at least the face normalization.

In accordance with an embodiment, the image processor may be further configured to receive an input to select a distant-selfie mode via an application stored in the memory to initiate the first output image generation process. The image processor may be further configured to adjust, by height normalization on the portion of the second self-portrait image, a second height level of the second face coordinates in the first image composition in accordance with a first height level of the first face coordinates. The first face coordinates of the first user may be detected based on capture of the first self-portrait image of the first user.

In accordance with an embodiment, the image processor may be further configured to tag a first region inside the first face coordinates and a second region located vertically below the first face coordinates as a foreground region. A third region that excludes the foreground region in the first self-portrait image may be tagged as the background region. The image processor may be further configured to substitute a first background of the first self-portrait image with a second background, based on a selection of a background image from a plurality of background images pre-stored in the memory.

In accordance with an embodiment, the image processor may be configured to detect a facial expression of the first user based on capture of the first self-portrait image of the first user. The image processor may be further configured to communicate display instruction of a first graphical emotion indicator, which may be indicative of the detected facial expression of the first user, to the second image-capture device via the first notification message. The first graphical emotion indicator may be displayed within the first face coordinates on the second image-capture device based on the display instruction. The first graphical emotion indicator displayed within the first face coordinates may be a reference, indicative of a first emotional state of the first user, to allow the second user to pose in a second emotional state similar to the first emotional state of the first user.

In accordance with an embodiment, the image processor may be further configured to communicate a second notification message to a third image-capture device associated with a third user. The second notification message may include a request to capture a third self-portrait image of the third user, the user-identifier of the first user, the first face coordinates of the first user, and the received second face coordinates of the second user. The first face coordinates and the second face coordinates are displayed on the third image-capture device as a reference based on capture of the third self-portrait image of the third user. The reference may be indicative of a position of the first user and the second user relative to third face coordinates of the third user in the third self-portrait image.

In accordance with an embodiment, the image processor may be further configured to receive the third self-portrait image and the third face coordinates of the third user from the third image-capture device based on the communicated second notification message. The image processor may be further configured execute the face normalization and the height normalization on a portion of the third self-portrait image, based on the first face coordinates, the second face coordinates, and the third face coordinates.

In accordance with an embodiment, the image processor may be configured to automatically generate a second output image in which the portion of the second self-portrait image and the portion of the third self-portrait image are concurrently overlaid on the background region of the selected background of the first self-portrait image of the first user in a second image composition, based on at least the face normalization and the height normalization. In some embodiments, the image processor may be configured to determine whether a detected face of a user at the time of capture of a self-portrait image of the user is correct or a false-positive. The false-positive related to face detection may be determined based on detected biological cues, such as eye blink, face movement, or a movement of facial tissue in a preview at the time of capture of a self-portrait image.

FIG. 1A is a block diagram that illustrates an exemplary network environment for composite selfie image composition for remote users, in accordance with an embodiment of the disclosure. With reference to FIG. 1A, there is shown a network environment 100. The network environment 100 may include a plurality of image-capture devices, such as a first image-capture device 102a, a second image-capture device 102b, and a third image-capture device 102c, a server 104, and a communication network 106. A user, such as a first user 108a, a second user 108b, and a third user 108c, may be associated with each of the plurality of image-capture devices. A camera application, such as applications 112a, 112b, and 112c, may be installed in each of the plurality of image-capture devices. The plurality of image-capture devices and the server 104 may be communicatively coupled to each other, via the communication network 106.

Each of the plurality of image-capture devices, such as the first image-capture device 102a, the second image-capture device 102b, and the third image-capture device 102c, may comprise suitable circuitry, interfaces, and/or code that may be configured to receive one or more self-portrait images and face coordinates of one or more users from other image-capture devices. Each of the plurality of image-capture devices, such as the first image-capture device 102a, may be configured to generate a final output image, such as a composite selfie (i.e. a "usie"), based on the received one or more self-portrait images. Examples of the plurality of image-capture devices may include, but are not limited to a smartphone, a tablet, a digital camera, a camcorder, a head-mounted device (HMD), a smart-glass, a virtual reality-, mixed reality-, or an augmented reality-based device, and/or other consumer electronic (CE) devices.

The server 104 may comprise suitable circuitry, interfaces, and/or code that may be configured to store one or more self-portrait images captured by each of the plurality of image-capture devices. Examples of the server 104 may include, but are not limited to, a database server, a file server, an application server, a cloud server, a web server, or a combination thereof.

The communication network 106 may include a communication medium through which the plurality of image-capture devices may be communicatively coupled with each other and the server 104. Examples of the communication network 106 may include, but are not limited to, the Internet, a cloud network, a Wireless Fidelity (Wi-Fi) network, a Local Area Network (LAN), and/or a Metropolitan Area Network (MAN). Various devices in the network environment 100 may be configured to connect to the communication network 106, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, including variants and/or a combinations thereof.

Each camera application, such as the applications 112a, 112b, and 112c, comprise suitable logic and/or code that may be configured to enable the remote users, such as the first user 108a, the second user 108b, and the third user 108c, to initiate a composite selfie generation process to obtain a composite selfie that mimics a "usie" captured together. The applications 112a, 112b, and 112c, enables registration of respective users or devices for a distant selfie service for the composite selfie generation process.

In operation, the first user 108a may provide an input on the first image-capture device 102a to launch the first application 112a. The first user 108a may provide an input to register the first image-capture device 102a to a distant selfie service by use of the first application 112a. For example, the first image-capture device 102a may be registered by a user-identifier, such as a mobile number of the first user 108a, by use of the first application 112a. The first image-capture device 102a may be configured to receive an input to select a distant-selfie mode via the first application 112a stored in the first image-capture device 102a to initiate a composite selfie generation process. The first image-capture device 102a may be configured to select desired users, for example, the second user 108b and the third user 108c, to whom requests for a composite selfie are to be sent.

In accordance with an embodiment, the first image-capture device 102a may be configured to receive an input to select, by use of the first application 112a, a background for a selfie to be captured. A plurality of background images may be pre-stored in the first image-capture device 102a. For example, images of famous places or user-selected images may be stored as background images in the first image-capture device 102a. Such images may be displayed via the first application 112a on the first image-capture device 102a for the selection. In some embodiments, an actual scene behind the first user 108a may be selected as an actual background. For example, the first user 108a may select "Your background" option, where an initiator's actual background (such as actual background scene of the first user 108a) is selected for the final composite selfie image. Thereafter, the first user 108a may capture a selfie, such as the first self-portrait image 110a, by the first image-capture device 102a.

In accordance with an embodiment, the first image-capture device 102a may be configured to detect a facial region of the first user 108a in a first field-of-view of the first image-capture device 102a at the time of capture of the first self-portrait image 110a. For example, a face rectangle that includes the facial region of the first user 108a may be visible on a display screen of the first self-portrait image 110a, at the time of capture of the first self-portrait image 110a. In cases where the selected background is different from the actual background scene of the first user 108a (i.e. when a stored background image is selected), the first image-capture device 102a may be configured to remove an actual background region of the first self-portrait image 110a. In such cases, a foreground-background matrix may be created by the first image-capture device 102a for the background removal. An example is shown and described in FIG. 1B.

Figure 1B:
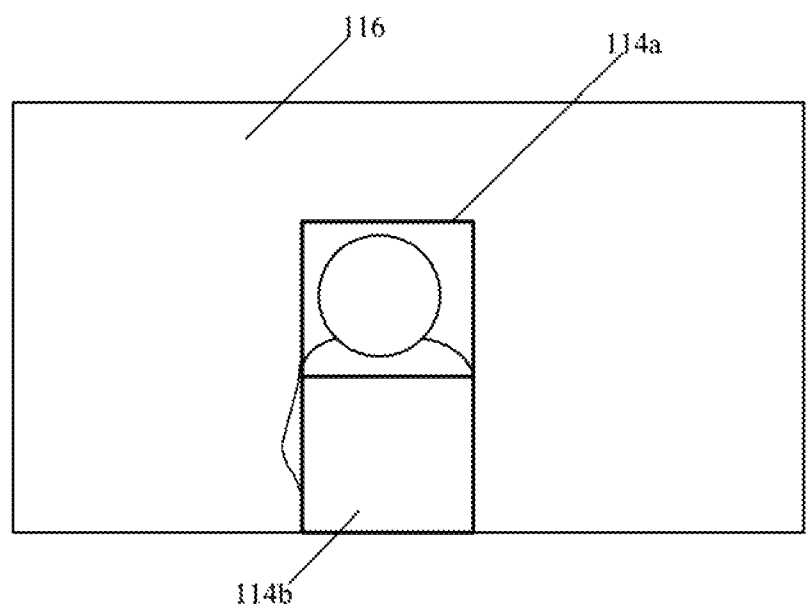
FIGS. 1B, 1C, 1D, 1E, 1F, 1G, 1H, and 1I, collectively illustrate exemplary operations for composite selfie image composition for remote users, in accordance with an embodiment of the disclosure.

FIGS. 1B, 1C, 1D, 1E, 1F, 1G, 1H, and 1I, collectively illustrates exemplary operations for composite selfie image composition for remote users, in accordance with an embodiment of the disclosure. FIGS. 1B to 1I are explained in conjunction with elements from FIG. 1A. With reference to FIG. 1B, there is shown a first region 114a, a second region 114b, and a third region 116 in the first self-portrait image 110a.

In accordance with an embodiment, the first image-capture device 102a may be configured to tag the first region 114a inside first face coordinates of the first user 108a as a foreground region. In some embodiments, the first face coordinates may refer to coordinates of a boundary of the facial region of the first user 108a obtained at the time of the face detection of the first user 108a. In some embodiments, the first face coordinates may refer to coordinates of a face rectangle that surrounds the facial region of the first user 108a. The first image-capture device 102a may be further configured to tag the second region 114b located vertically below the first face coordinates as a probable foreground region. The third region 116 refers to a region that excludes the foreground region in the first self-portrait image 110a and may be tagged as the background region. Alternatively stated, the regions inside the face coordinates (such as the first region 114a), and just below the face coordinates (such as the second region 114b), are marked as the probable foreground region and the remaining regions, that lie for example, left and right of the face rectangle may be marked as probable background region. The first image-capture device 102a may be configured to utilize the above tagged regions (for example, the probable foreground and background regions) to generate a foreground-background matrix. The foreground-background matrix may refer to demarcated regions indicative of probable foreground and background. The foreground-background matrix may then be used to generate a FG mask of the first user 108a devoid of the background region.

In accordance with an embodiment, the first image-capture device 102a may be configured to utilize one or more foreground-background segmentation algorithms, for example, a Grabcut algorithm, to generate the FG mask of the first user 108a devoid of the background region. In some embodiments, the first image-capture device 102a may be configured to apply erosion and dilation filters to remove certain left-over image artifacts, such as undesired marks, on and around the FG mask of the first user 108a.

Figure 1C:
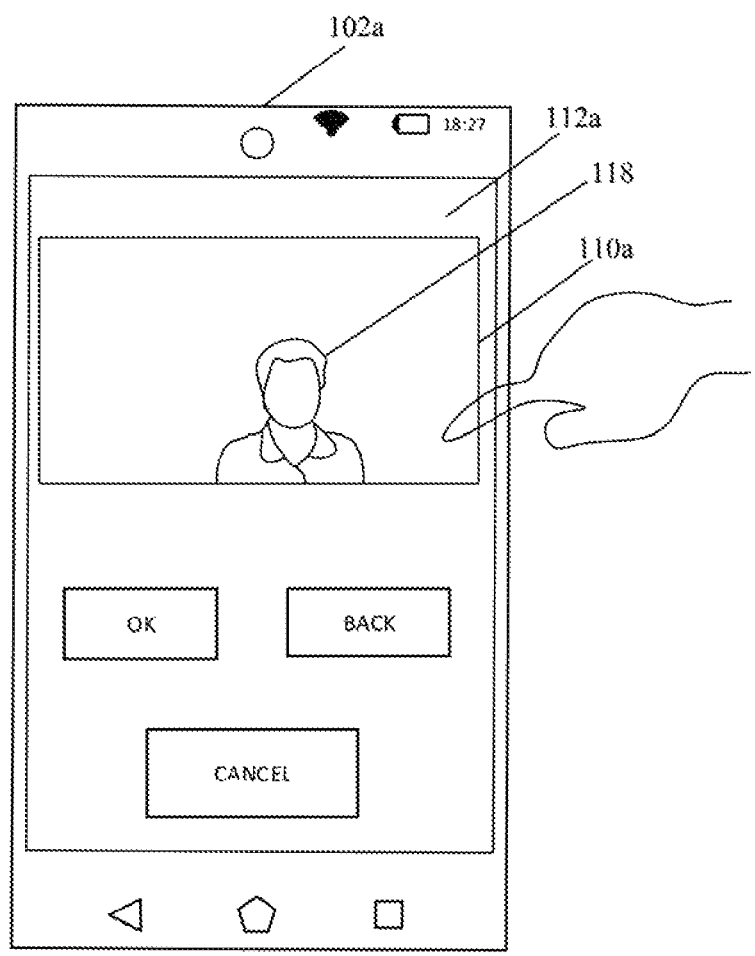

With reference to FIG. 1C, there is shown a segmentation result 118 that refers to the background removed image of the first self-portrait image 110a. The first image-capture device 102a may be configured to generate the segmentation result 118 that includes the foreground region that corresponds to the first user 108a. The segmentation result 118 is generated based on the FG mask of the first user 108a. In accordance with an embodiment, the first image-capture device 102a may be configured to multiply the FG mask of the first user 108a with the first self-portrait image 110a to obtain the segmentation result 118 that refers to the background removed image of the first self-portrait image 110a, as shown. The first image-capture device 102a may be configured to display the segmentation result 118 of the first self-portrait image 110a on the display screen, via the first application 112a. In certain cases, some portions of background region may not be removed completely and may be visible on the first application 112a. In such cases, the first user 108a may provide a single touch input on the visible background portion on the display screen by use of the first application 112a. The first user 108a may not be required to provide touch/click input to all regions of the background portion. The first image-capture device 102a may be configured to receive a single touch input to remove the remaining background portion(s), if any. Based on single touch input, the first image-capture device 102a may be configured to identify similar background pixels (similar to pixels touched/clicked for removal) of the background region, and remove the identified background pixels from the segmentation result 118. This reduces manual interaction, and increases accuracy of the segmentation result 118 that includes the foreground region that corresponds to the first user 108a. In some embodiments, the first image-capture device 102a may be configured to smoothen edges of the segmentation result 118 using edge detectors, for example, Canny edge detector, known in the art. In some embodiments, the first user 108a may undo the changes by a press or click of a "Back" button. The first user 108a may take a new self-portrait image (i.e. a new selfie) by cancellation of the current composite selfie generation process, by a press or click of a "cancel" button, as shown. The first user 108a may also click or press the "OK" button, in the first application 112a to select the segmentation result 118 and proceed to next operation. Thereafter, the first image-capture device 102a may be configured to substitute a first background (mono-colored background pixels, e.g. black colored pixels) of the first self-portrait image 110a with a second background. The second background corresponds to the selected background image. The background removal may not be required when an actual scene behind the first user 108a is selected as an actual background. For example, when the first user 108*a* selects "Your background" option, where an initiator's actual background (such as actual background scene of the first user 108*a* in this case) is selected for the final composite selfie image, the background removal may not be required.

In accordance with an embodiment, the first image-capture device 102*a* may be configured to store the first self-portrait image 110*a* of the first user 108*a* along with the first face coordinates of the first user 108*a*. The stored first self-portrait image 110*a* may include the selected background. Based on the selection of the desired users, for example, the second user 108*b* and the third user 108*c* in that order, requests for participation in the composite selfie generation process may be sent to the selected users in a sequential order of selection. The first image-capture device 102*a* may be configured to communicate a first notification message to the second image-capture device 102*b* associated with the second user 108*b*. The first notification message may include a request to capture a second self-portrait image of the second user 108*b*, the user-identifier of the first user 108*a* and the first face coordinates of the first user 108*a*. In accordance with an embodiment, the first notification message may also be a push notification sent via the server 104.

Figure 1D:
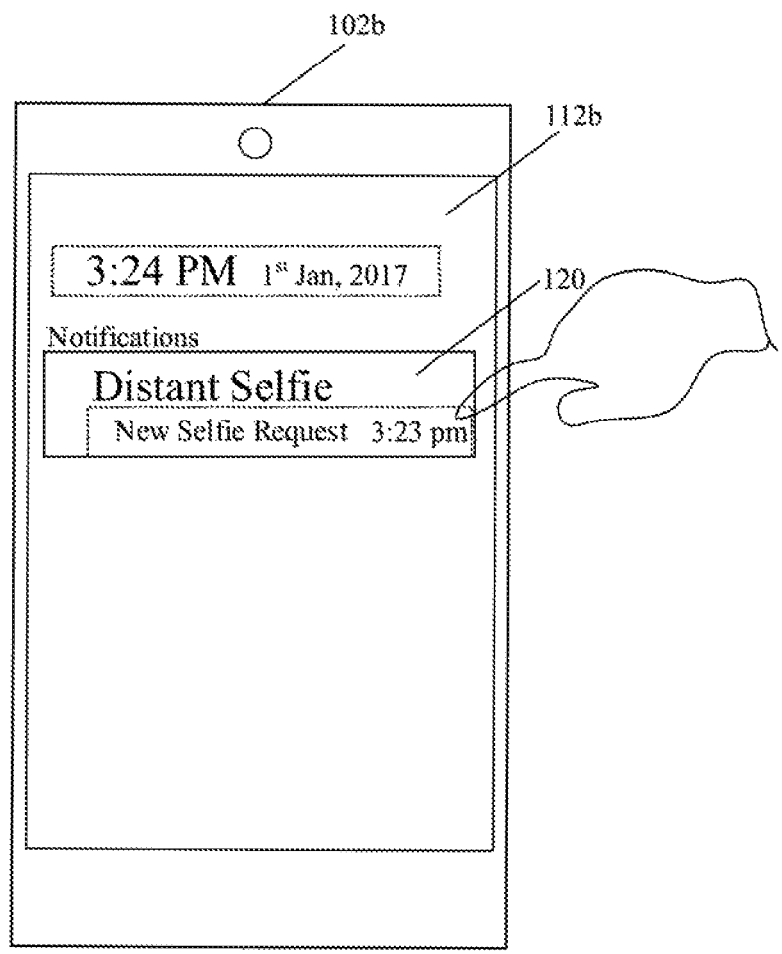

With reference to FIG. 1D, there is shown a first notification message 120 on the second image-capture device 102*b*, displayed via the second application 112*b*. The second image-capture device 102*b* may be configured to receive the first notification message 120 from the first image-capture device 102*a*. The second user 108*b* may click or press the first notification message 120. The second image-capture device 102*b* may be configured to open a custom camera viewfinder interface based on a received input that corresponds to selection of the first notification message 120.

Figure 1E:
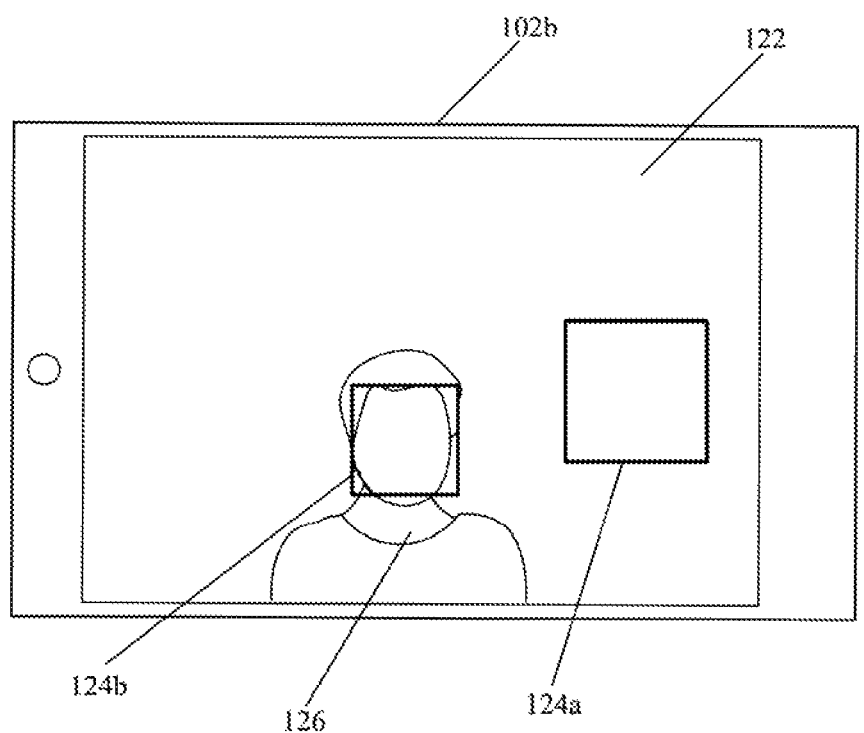

With reference to FIG. 1E, there is shown a custom camera viewfinder (CCV) application interface 122 rendered on the second image-capture device 102*b*. The CCV application interface 122 may include a first face rectangle 124*a*, a second face rectangle 124*b*, and a view 126 of the second user 108*b* as viewed through an integrated camera of the second image-capture device 102*b* at the time of capture of a selfie of the second user 108*b* by the second image-capture device 102*b*. The CCV application interface 122 may be a preview generated based on the received first notification message 120, before capture of the actual selfie, such as the second self-portrait image 110*b*, of the second user 108*b*. The CCV application interface 122 may be a part of the second application 112*b* installed at the second image-capture device 102*b*. The second image-capture device 102*b* may be configured to control display the first face coordinates of the first user 108*a* (for example, the first face rectangle 124*a*) on the CCV application interface 122 before capture of the second self-portrait image 110*b* of the second user 108*b*. The displayed first face coordinates of the first user 108*a* (such as the first face rectangle 124*a*) may serve as a reference for the second user 108*b*, who may then position accordingly to capture of the second self-portrait image 110*b*.

The second image-capture device 102*b* may be configured to detect a facial region of the second user 108*b*, represented by the second face rectangle 124*b*, at the time capture of the second self-portrait image 110*b* of the second user 108*b*, by use of the generated preview. Similar to the first image-capture device 102*a*, the second image-capture device 102*b* may be configured to remove the background region of the second self-portrait image 110*b*. The second image-capture device 102*b* may be configured to communicate the second self-portrait image 110*b* and the second face coordinates (represented by the second face rectangle 124*b* in this case) of the second user 108*b* to the first image-capture device 102*a*. In some embodiments, the second self-portrait image 110*b* and the second face coordinates of the second user 108*b* may be communicated to the server 104. In some embodiments, the background removed image of the second self-portrait image 110*b*, may be communicated to the server 104 or the first image-capture device 102*a* instead of the second self-portrait image 110*b*.

In accordance with an embodiment, the first image-capture device 102*a* may be configured to receive a confirmation message that the second image-capture device 102*b* has captured the second self-portrait image 110*b*. In accordance with an embodiment, the confirmation message may include the second self-portrait image 110*b* and the second face coordinates of the second user 108*b*. In some embodiments, the confirmation message may include a link to retrieve the second self-portrait image 110*b* along with the second face coordinates of the second user 108*b*, from the server 104. After receipt of the second self-portrait image 110*b* and second face coordinates of the second user 108*b*, the first image-capture device 102*a* may be configured to generate a second notification message for the third image-capture device 102*c*. The first image-capture device 102*a* may be configured to communicate the second notification message to the third image-capture device 102*c* associated with the third user 108*c*. The second notification message may include a request to capture the third self-portrait image 110*c* of the third user 108*c*, the user-identifier of the first user 108*a*, the first face coordinates of the first user 108*a*, and the received second face coordinates of the second user 108*b*.

In certain scenarios, where a single user, such as the second user 108*b*, is selected for the composite selfie generation, the second notification message may not be generated. In such cases, the first image-capture device 102*a* may be configured to adjust, by face normalization on a portion of the second self-portrait image 110*b*, a second face size of the second user 108*b* in accordance with a first face size of the first user 108*a*. The adjustment by face normalization may be done based on comparison of the first face coordinates with the second face coordinates. The first image-capture device 102*a* may be further configured to adjust, by height normalization on the portion of the second self-portrait image 110*b*, a second height level of the second face coordinates in accordance with a first height level of the first face coordinates.

Figure 1F:
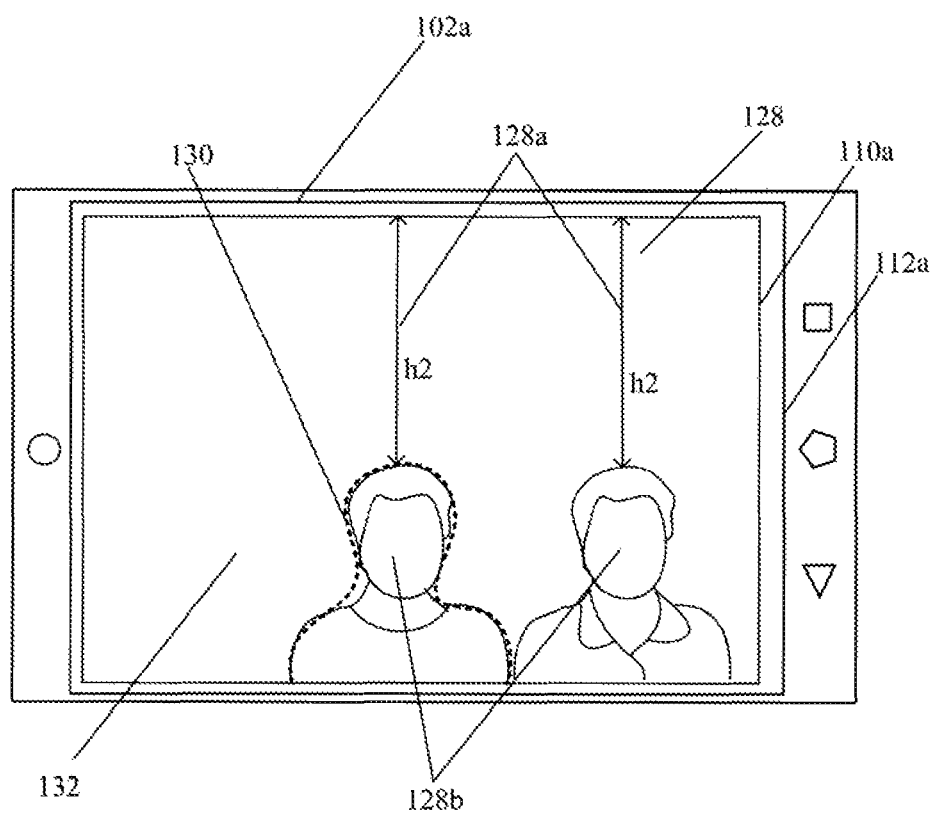

With reference to FIG. 1F, there is shown a first image composition 128 of a first composite selfie. The first image-capture device 102*a* may be further configured to generate a first output image, in which a portion 130 of the second self-portrait image 110*b* may be overlaid on a background region 132 of the selected background of the first self-portrait image 110*a* of the first user 108*a* in the first image composition 128. In some embodiments, the first output image may be generated based on face normalization 128*b*. In some embodiments, the first output image may be generated based on face normalization 128*b* and height normalization 128*a*. The first image-capture device 102*a* may be further configured to determine and compare the resolution, face size, and brightness properties of both the facial regions of the first user 108*a* and the second user 108*b* in the face normalization 128*b*. Thereafter, one of the facial regions (such as the portion 130 that includes the facial region of the second user 108*b* in the second self-portrait image 110*b*) is processed and modified such that both the facial regions of the first user 108*a* and the second user 108*b* in the first image composition 128 appear to be of similar sizes, resolution, and of same brightness properties by the face normalization 128b. Further, by the height normalization 128a, one of the facial regions (such as the portion 130 that includes the facial region of the second user 108b in the second self-portrait image 110b) is positioned such that both the facial regions of the first user 108a and the second user 108b appear to be at a same or similar height ("h2") in the first image composition 128, a shown.

In certain scenarios, where a plurality of users, such as the second user 108b and the third user 108c, are selected for the composite selfie generation, a second notification message may be communicated to the third image-capture device 102c associated with the third user 108c. In some embodiments, a first language of the communicated notification message, such as the second notification message, may be identified by the server 104 in cases where the notification messages, such as the second notification message, is communicated via the server 104. The first language of the communicated notification messages, such as the second notification message, may be translated to a second language in accordance with language settings associated with the third user 108c of the third image-capture device 102c. The language settings may be determined based on a user-defined language preference, a language associated with the geographical region in which the recipient device, such as the third image-capture device 102c is located, and/or historical data related to the recipient device, such as the third image-capture device 102c.

Figure 1G:
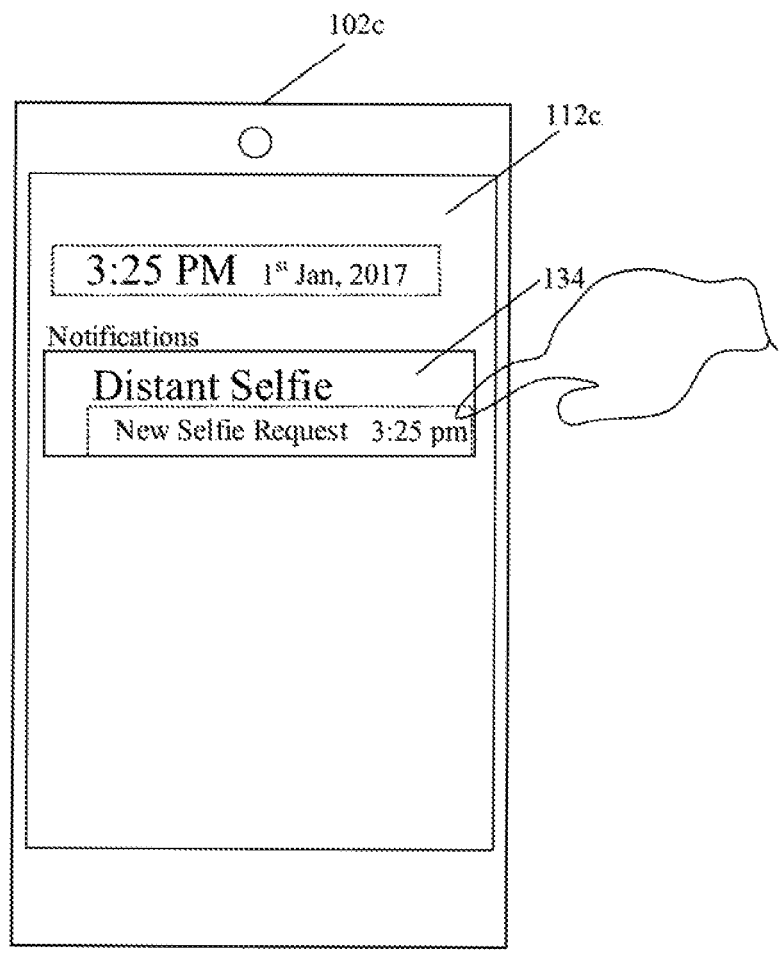

With reference to FIG. 1G, there is shown a second notification message 134 on the third image-capture device 102c, displayed via the third application 112c installed in the third image-capture device 102c. The third image-capture device 102c may be configured to receive the second notification message 134 from the first image-capture device 102a. The third user 108c may click or press the second notification message 134. The third image-capture device 102c may be configured to launch a CCV application interface based on a received input that corresponds to selection of the second notification message 134.

Figure 1H:
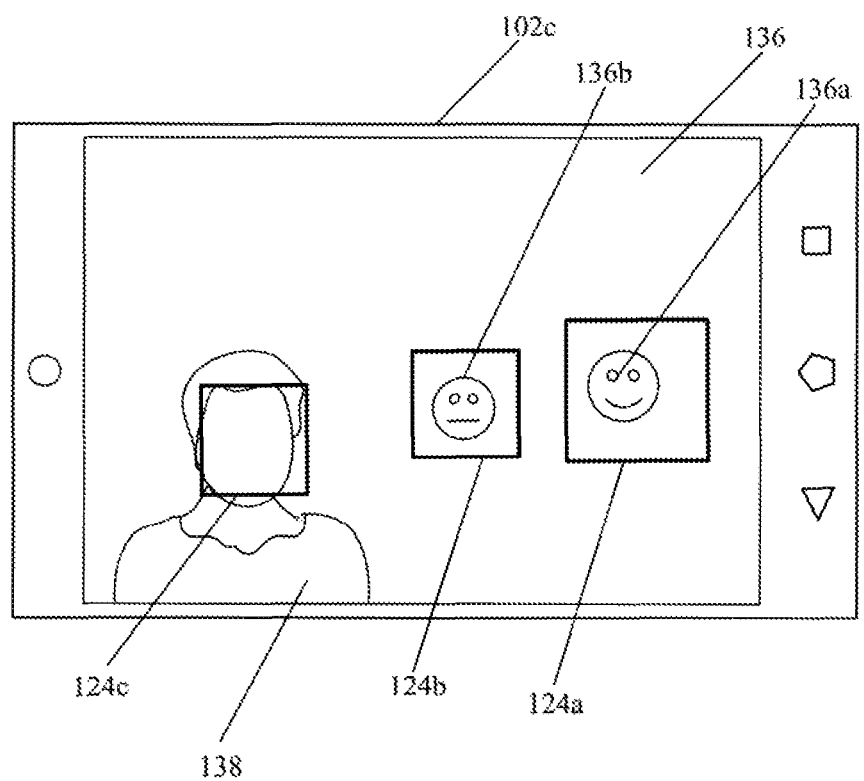

With reference to FIG. 1H, there is shown a CCV application interface 136 rendered on the third image-capture device 102c. The CCV application interface 136 may include the first face rectangle 124a, the second face rectangle 124b, a third face rectangle 124c, and a view 138 of the third user 108c at the time of capture of a selfie of the third user 108c by the third image-capture device 102c. The CCV application interface 136 may be similar to the CCV application interface 122. The CCV application interface 136 may be a preview generated based on the received second notification message 134, before capture of the actual selfie, such as the third self-portrait image 110c, of the third user 108c. The third image-capture device 102c may be configured to control display the first face coordinates of the first user 108a and the second face coordinates of the second user 108b (for example, the first face rectangle 124a and the second face rectangle 124b) on the CCV application interface 136 before capture of the third self-portrait image 110c. The displayed first face coordinates and the second face coordinates (such as the first face rectangle 124a and the second face rectangle 124b) may serve as a reference for the third user 108c, who may then position accordingly for capture of the third self-portrait image 110c. The reference may be indicative of a position of the first user 108a and the second user 108b relative to the third face coordinates of the third user 108c in the third self-portrait image 110c that is to be captured. The third image-capture device 102c may also be configured to detect a facial region of the third user 108c, represented by the third face rectangle 124c, at the time capture of the third self-portrait image 110c, by use of the generated preview. Similar to the first image-capture device 102a and/or the second image-capture device 102b, the third image-capture device 102c may be configured to remove the background region of the third self-portrait image 110c.

In some embodiments, the first image-capture device 102a may be configured to communicate a display instruction of a first graphical emotion indicator 136a and a second graphical emotion indicator 136b to the third image-capture device 102c. The first graphical emotion indicator 136a may be indicative of the detected facial expression or facial deformation, for example, a smiling facial expression of the first user 108a. Similarly, the second graphical emotion indicator 136b may be indicative of the detected facial expression or facial deformation, for example, a neutral expression with raised eyebrows (eyebrows not shown in FIG. 1H), of the second user 108b. The display instruction may include unique expression codes that may be used by the recipient device, such as the third image-capture device 102c, to identify the graphical emotion indicators and the position of the graphical emotion indicators to be displayed. The third image-capture device 102c may be configured to read the received unique expression codes and accordingly control display of the first graphical emotion indicator 136a within the first face coordinates (such as the first face rectangle 124a) at the time of capture of the third self-portrait image 110c. Similarly, the third image-capture device 102c may be configured to control display of the second graphical emotion indicator 136b within the second face coordinates (such as the second face rectangle 124b) at the time of capture of the third self-portrait image 110c. The displayed first graphical emotion indicator 136a and the second graphical emotion indicator 136b may serve as a reference for the third user 108c to pose in a same or similar manner to the emotional states and/or face deformations of the first user 108a and/or the second user 108b, as shown. The third image-capture device 102c may be configured to capture and then communicate the third self-portrait image 110c and the third face coordinates (represented by the third face rectangle 124c) to the first image-capture device 102a. Similar to the second image-capture device 102b, the third self-portrait image 110c and the third face coordinates of the third user 108c, may also be communicated to the server 104.

In accordance with an embodiment, the first image-capture device 102a may be further configured to receive the third self-portrait image 110c and the third face coordinates of the third user 108c from the third image-capture device 102c, based on the communicated second notification message 134. The first image-capture device 102a may be further configured to execute the face normalization and the height normalization on a portion of the third self-portrait image 110c, based on the first face coordinates, the second face coordinates, and the third second face coordinates.

Figure 1I:
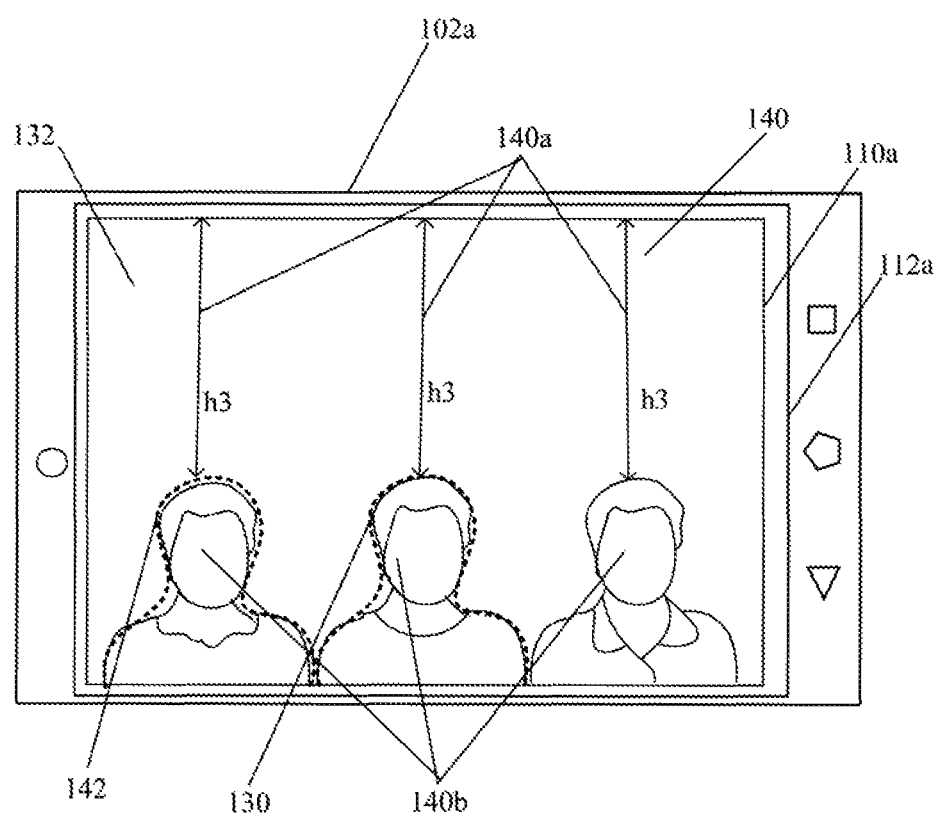

With reference to FIG. 1I, there is shown a second image composition 140 of a second composite selfie. The first image-capture device 102a may be configured to automatically generate a second output image in which the portion 130 of the second self-portrait image 110b and a portion 142 of the third self-portrait image 110c are concurrently overlaid on the background region 132 of the selected background of the first self-portrait image 110a of the first user 108a in the second image composition 140. The second output image may be generated based on face normalization 140b and the height normalization 140a. The first image-capture device 102a may be configured to compute a distance between an upper edge of each face rectangle (such as each of the face rectangles 124a, 124b, and 124c) using the face coordinates and the top boundary of each of the self-portrait images 110a, 110b, and 110c after face normalization 140b. Thereafter, the first image-capture device 102a may be configured to adjust height level of the second face coordinates and the third face coordinates in the second image composition 140 in accordance with the height level (such as "h3") of the first face coordinates. The height level may be adjusted based on the computed distances. The height level of the portion 130 of the second self-portrait image 110b and the portion 142 of the third self-portrait image 110c may be adjusted by the height normalization 140a such that the facial regions of all the users (such as the first user 108a, the second user 108b, and the third user 108c) lie at a same or similar height ("h3") in the second image composition 140, as shown. The disclosed first image-capture device 102a for automated composite selfie image composition for remote users, such as the second user 108b and the third user 108c, may be implemented in various application areas, such as automatic video or image editing systems for "usie" or composite selfie image composition. The automated composite selfie image composition refers to automatic generation of a "composite selfie" or "usie" based on receipts of multiple self-portrait images of multiple users located remotely.

Figure 2:
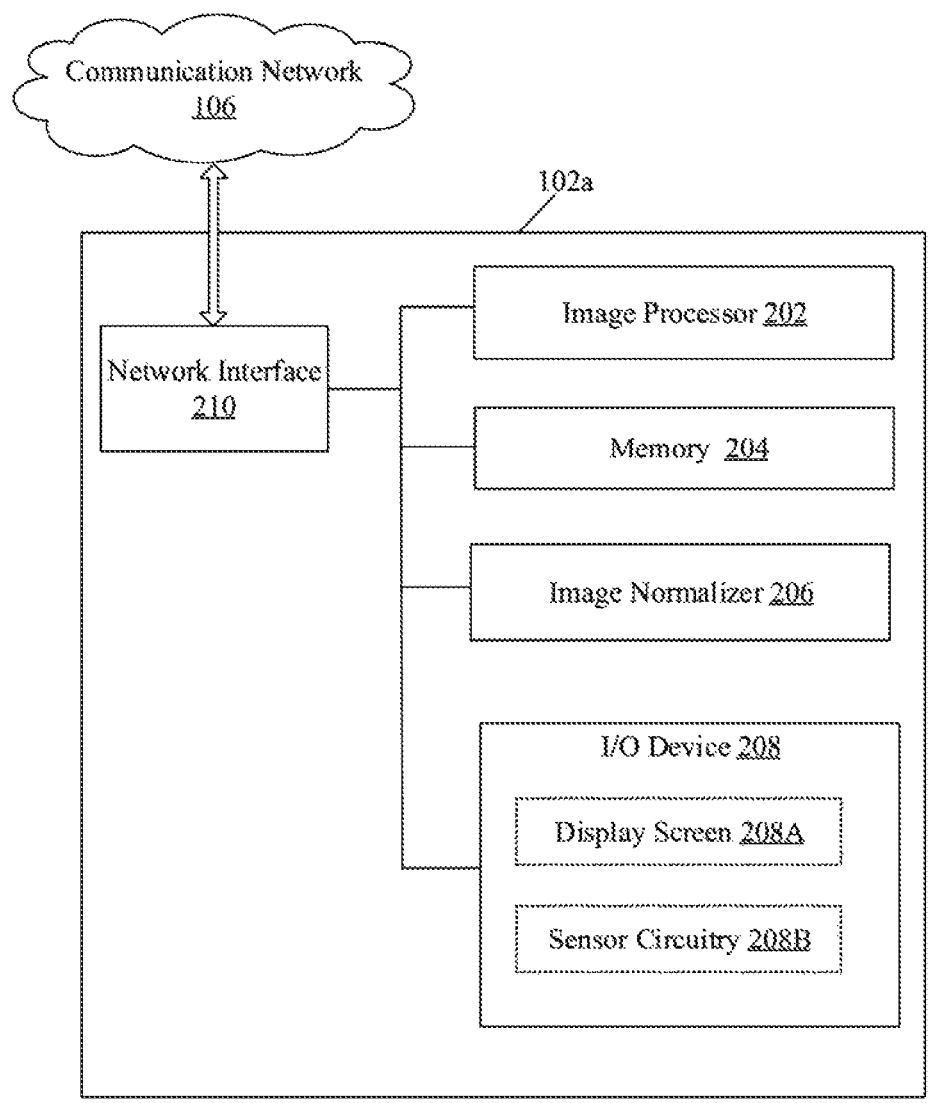
FIG. 2 is a block diagram that illustrates an exemplary image-capture device, in accordance with an embodiment of the disclosure.

FIG. 2 is a block diagram that illustrates an exemplary image-capture device, in accordance with an embodiment of the disclosure. FIG. 2 is explained in conjunction with elements from FIGS. 1A to 1I. With reference to FIG. 2, there is shown the first image-capture device 102a. The first image-capture device 102a may include one or more circuits, such as an image processor 202, a memory 204, and an image normalizer 206, an I/O device 208, and a network interface 210. The I/O device 208 may include a display screen 208A and sensor circuitry 208B. The sensor circuitry 208B is shown as an integrated unit of the first image-capture device 102a, in an example. The image processor 202 may be communicatively coupled with the memory 204, the image normalizer 206, the I/O device 208, and the network interface 210. The network interface 210 may facilitate communication with the server 104, via communication network 106. The first image-capture device 102a may be similar to the second image-capture device 102b and the third image-capture device 102c.

The image processor 202 may comprise suitable logic, circuitry, interfaces, and/or code that may be configured to receive one or more self-portrait images and face coordinates of one or more users from one or more other image-capture devices, such as the second image-capture device 102b and the third image-capture device 102c. The image processor 202 may be configured to generate a final output self-portrait image, such as a composite selfie (i.e. a usie), based on the received one or more self-portrait images. The image processor 202 may be configured to execute a set of instructions stored in the memory 204. The image processor 202 may be implemented based on a number of processor technologies known in the art. Examples of the image processor 202 may be a Reduced Instruction Set Computing (RISC) processor, an Application-Specific Integrated Circuit (ASIC) processor, a Complex Instruction Set Computing (CISC), a hardware processor, a central processing unit (CPU), and/or other processors or control circuits.

The memory 204 may comprise suitable logic, circuitry, and/or interfaces that may be configured to store self-portrait images of different users (such as the first user 108a and the second user 108b) in association with face coordinates of the corresponding users. The memory 204 may also store a set of instructions executable by the image processor 202. The memory 204 may be configured to store operating systems and associated applications. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The image normalizer 206 may comprise suitable logic, circuitry, interfaces, and/or code that may be configured to adjust face sizes of different users by face normalization on certain portions (portion that includes a facial region of a user) of different self-portrait images. The adjusted face sizes may then be used to generate a final output image, such as a composite selfie or usie image of remote users. The image normalizer 206 may be implemented as a separate processor (such as a coprocessor), or circuitry in the first image-capture device 102a. The image normalizer 206 and the image processor 202 may be implemented as an integrated processor, an integrated circuit, or a cluster of processors that perform the functions for the image normalizer 206 and the image processor 202.

The I/O device 208 may comprise suitable logic, circuitry, interfaces, and/or code that may be configured to receive an input and provide an output to a user. The I/O device 208 may comprise various input and output devices that may be configured to communicate with the image processor 202. Examples of the input devices may include, but not limited to, a touch screen, a keyboard, a mouse, a joystick, a microphone, and/or the sensor circuitry 208B. Examples of the output devices may include, but not limited to, the display screen 208A and/or a speaker.

The display screen 208A may comprise suitable logic, circuitry, interfaces, and/or code that may be configured to render the segmentation result 118 via the first application 112a. In accordance with an embodiment, the display screen 208A may be able to receive input from a user. In such a scenario, the display screen 208A may be a touch screen that enables the user to provide input. The touch screen may correspond to at least one of a resistive touch screen, a capacitive touch screen, or a thermal touch screen. In accordance with an embodiment, the display screen 208A may receive the input through a virtual keypad, a stylus, a gesture-based input, and/or a touch-based input. The display screen 208A may be realized through several known technologies such as, but not limited to, at least one of a Liquid Crystal Display (LCD) display, a Light Emitting Diode (LED) display, a plasma display, and/or an Organic LED (OLED) display technology, and/or other display. In accordance with an embodiment, the display screen 208A may refer to a display screen of smart-glass device, a see-through display, a projection-based display, an electro-chromic display, a cut-to-shape display, and/or a transparent display.

The network interface 210 may comprise suitable logic, circuitry, interfaces, and/or code that may be configured to facilitate communication between the first image-capture device 102a and the server 104, via the communication network 106. The network interface 210 may also facilitate communication between the first image-capture device 102a and other image-capture devices, such as the second image-capture device 102b and the third image-capture device 102c. The network interface 210 may be implemented by use of various known technologies to support wired or wireless communication of the first image-capture device 102a with the communication network 106. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS).

The functions and/or operations performed by the first image-capture device 102a, as described in FIGS. 1A to 1I, may be performed by the image processor 202 and/or the image normalizer 206. Other operations performed by the image processor 202 and the image normalizer 206 are further described, for example, in the FIGS. 3A and 3B.

Figure 3A:
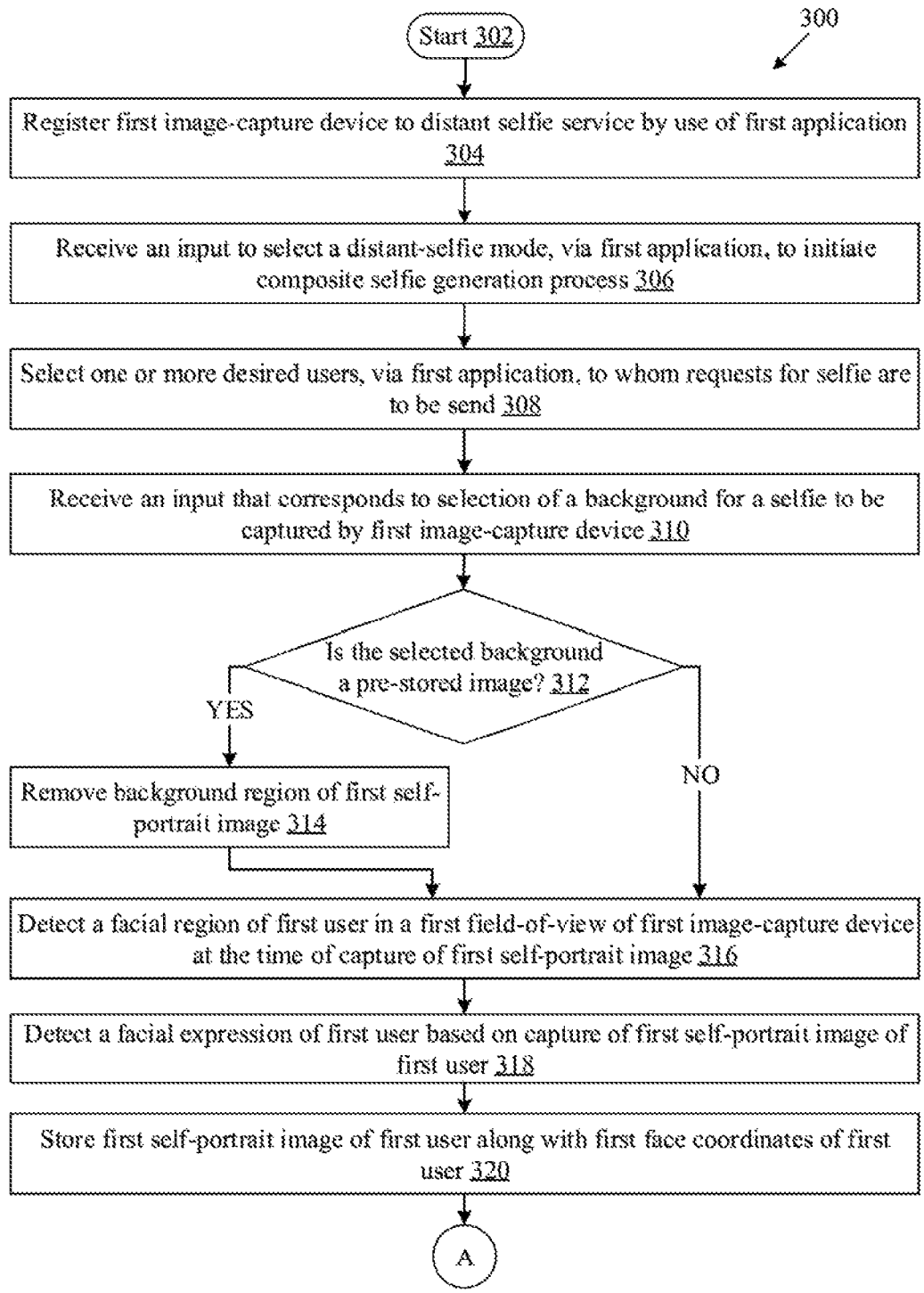
FIGS. 3A, 3B, and 3C, collectively, illustrate an exemplary scenario for implementation of the disclosed method and device for composite selfie image composition for remote users, in accordance with an embodiment of the disclosure.
Figure 3B:
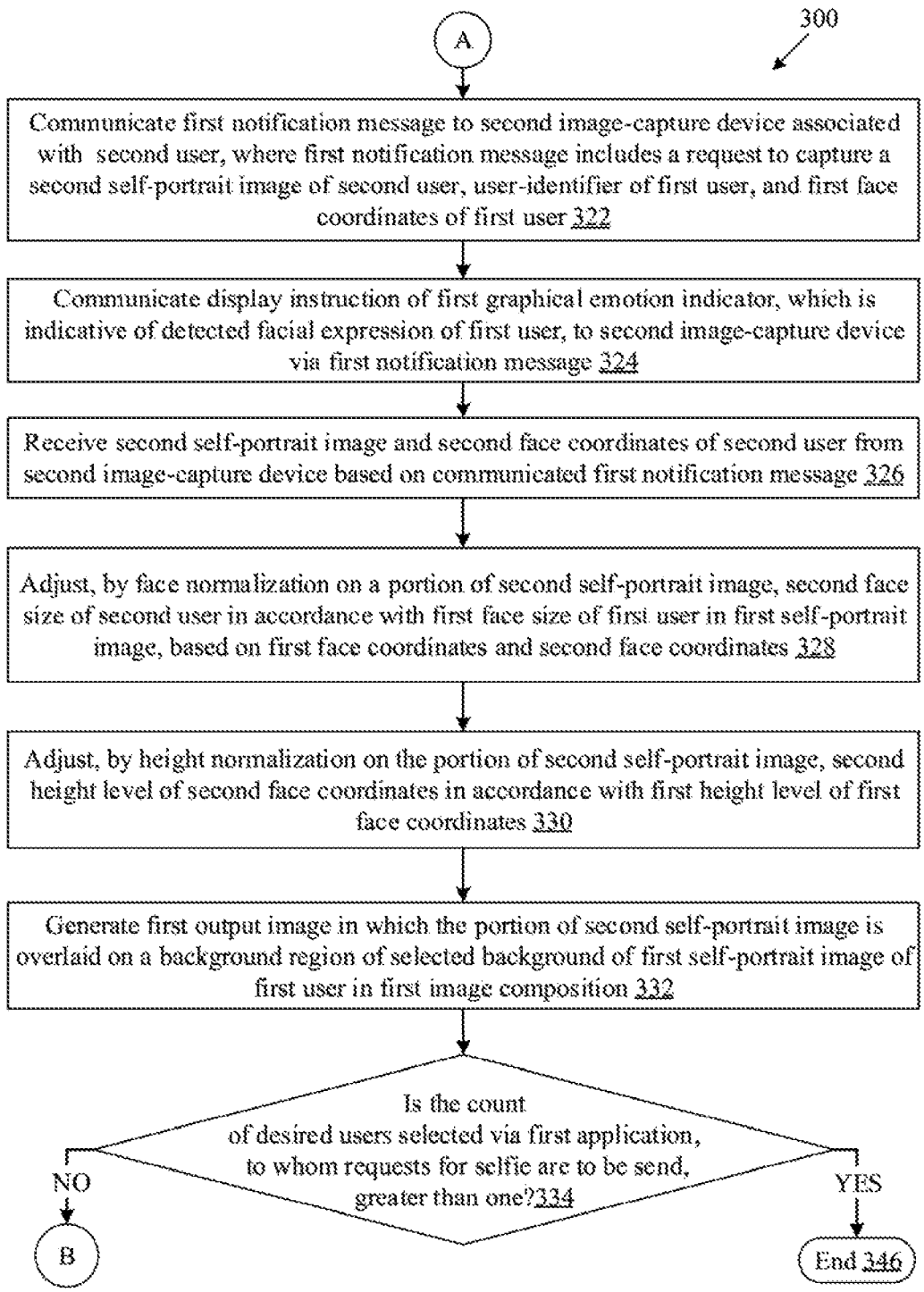
Figure 3C:
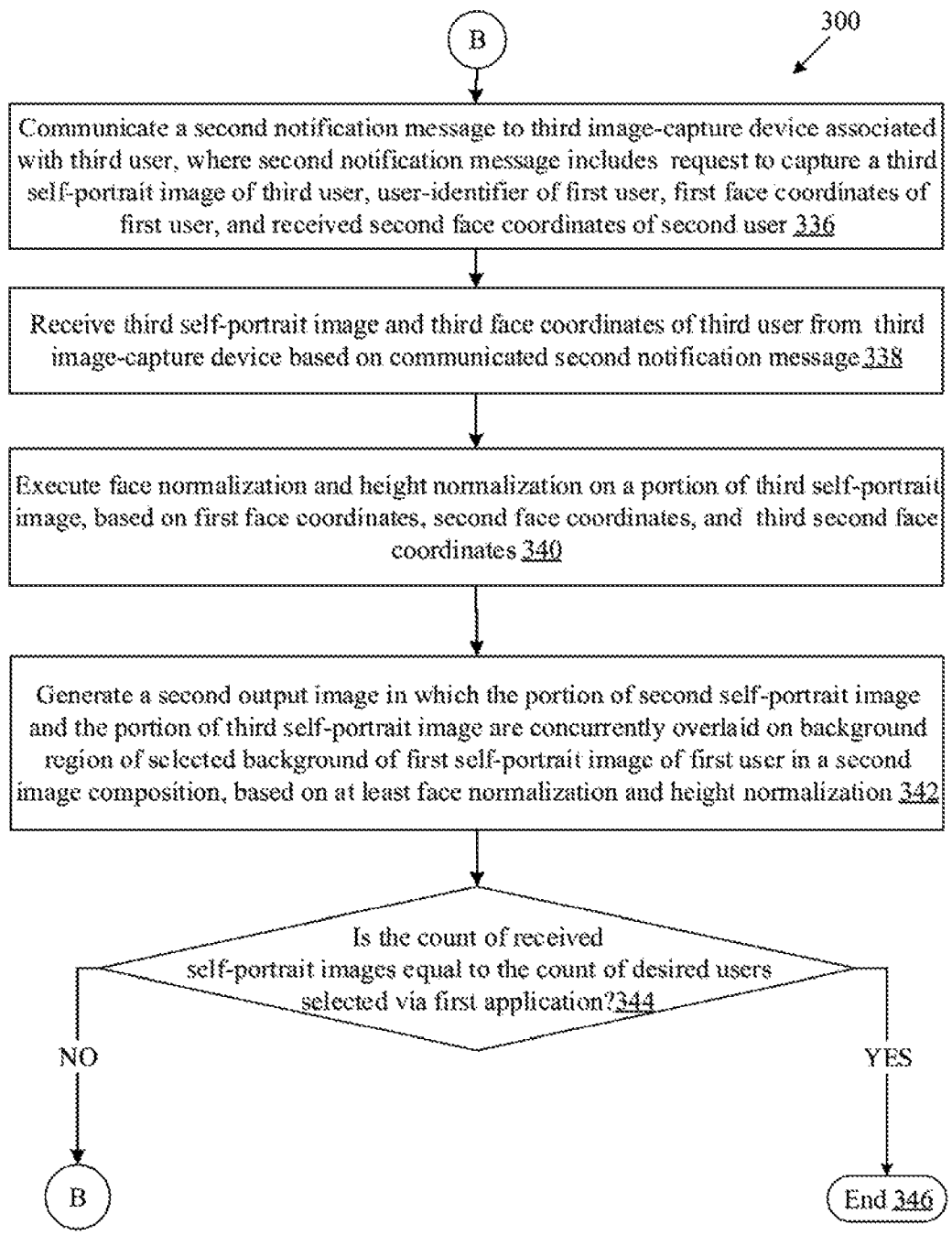

FIGS. 3A, 3B, and 3C collectively, depict a flow chart that illustrates an exemplary method for composite selfie image composition for remote users, in accordance with an embodiment of the disclosure. With reference to FIGS. 3A and 3B, there is shown a flow chart 300. The flow chart 300 implemented in an image-capture device, such as the first image-capture device 102a, is described in conjunction with elements from FIGS. 1A to 1I, and 2. The method starts at 302 and proceeds to 304.

At 304, the first image-capture device 102a may be registered to a distant selfie service, by use of the first application 112a. The image processor 202 may be configured to register the first image-capture device 102a to a service, such as the distant selfie service, by use of the first application 112a installed in the memory 204. In accordance with an embodiment, the distant selfie service may be provided by the server 104. In such embodiment, the first image-capture device 102a, by use of the first application 112a, may be configured to communicate a registration request, via the network interface 210, to the server 104. Similar to the first image-capture device 102a, other image-capture devices, such as the second image-capture device 102b and the third image-capture device 102c, may also register to the distant selfie service, by use of their corresponding applications, such as the second application 112b and the third application 112c.

At 306, an input may be received to select a distant-selfie mode, via the first application 112a, to initiate a composite selfie generation process. The image processor 202 may be configured to receive the input to select the distant-selfie mode, via the first application 112a. The distant-selfie mode may refer to a camera setting in the first application 112a that initiates the composite selfie, for example a "usie" generation process for remote users.

At 308, one or more desired users to whom requests for selfie are to be send 308 may be selected via the first application 112a. The image processor 202 may be configured to select one or more desired users, for example, the second user 108b and the third user 108c, via the first application 112a. A contact list of users, such as friends, family, or other users, may be displayed via the first application 112a for the selection.

At 310, an input that corresponds to selection of a background for a selfie to be captured by the first image-capture device 102a, may be received. The image processor 202 may be configured to receive the input that corresponds to selection of a background for a selfie (such as the first self-portrait image 110a) to be captured by the first image-capture device 102a. For example, images of famous places or user-selected images may be stored as background images in the memory 204 of the first image-capture device 102a. Such images may be displayed via the first application 112a on the first image-capture device 102a for selection. An actual scene behind the first user 108a may also be selected as an actual background. For example, the first user 108a may select "Your background" option, where an initiator's actual background (such as actual background scene of the first user 108a) may be selected for the final composite selfie image.

At 312, it may be determined whether the selected background is a pre-stored image. The image processor 202 may be configured to determine whether the selected background is a pre-stored image. In cases where the selected background is a pre-stored image, the control may pass to 314. In cases where the selected background is the actual background scene in the field-of-view of the sensor circuitry 208B, the control may pass to 316.

At 314, an actual background region of the first self-portrait image 110a may be removed. The image processor 202 may be configured to remove the actual background region of the first self-portrait image 110a that is captured by the sensor circuitry 208B of the first image-capture device 102a. In accordance with an embodiment, the image processor 202 may be configured to create a background-foreground matrix for the background removal. An example of background removal process in the first self-portrait image 110a is shown and described in the FIGS. 1B and 1C. The image processor 202 may be configured to substitute a first background, for example, the actual background region, of the first self-portrait image 110a with a second background (i.e. the selected background), based on the selection of the background image from the plurality of background images pre-stored in the memory 204.

At 316, a facial region of the first user 108a may be detected in a first field-of-view of the first image-capture device 102a at the time of capture of the first self-portrait image 110a. The image processor 202 may be configured to detect the facial region of the first user 108a in the first field-of-view of the sensor circuitry 208B (such as a front camera of the first image-capture device 102a) at the time of capture of the first self-portrait image 110a.

At 318, a facial expression of first user 108a may be detected based on capture of the first self-portrait image 110a of the first user 108a. The image processor 202 may be configured to detect the facial expression of the first user 108a in the first field-of-view of the sensor circuitry 208B at the time of capture of the first self-portrait image 110a. For example, the first user 108a may make different type of faces with different emotions, for example, frog face, pout face, tilted face, one eye-closed, raised eye brows, or other types of facial deformations with different expressions or emotions, such as smile, anger, neutral, and the like.

At 320, the first self-portrait image 110a of the first user 108a may be stored along with the first face coordinates of the first user 108a. The image processor 202 may be configured to store the first self-portrait image 110a of the first user 108*a* along with the first face coordinates of the first user 108*a*. In accordance with an embodiment, the image processor 202 may be configured to store the detected facial expression and deformations of first user 108*a* as a unique expression code. Each unique expression code may be associated with a graphical emotion indicator of a plurality of graphical emotion indicators stored in the memory 204 or the server 104.

At 322 (FIG. 3B), a first notification message may be communicated to the second image-capture device 102*b* associated with the second user 108*b*. The image processor 202 may be configured to communicate the first notification message (such as the first notification message 120 FIG. 1D), to the second image-capture device 102*b* associated with the second user 108*b*. The first notification message may include a request to capture a second self-portrait image of the second user 108*b*, the user-identifier, such as contact number, of the first user 108*a* and the first face coordinates of the first user 108*a*. In accordance with an embodiment, the first notification message may also be a push notification communicated in conjunction with the server 104.

At 324, a display instruction of a first graphical emotion indicator, which is indicative of the detected facial expression (or facial deformation) of the first user 108*a*, may be communicated to the second image-capture device 102*b*. In accordance with an embodiment, the image processor 202 may be configured to communicate the display instruction via the first notification message as the unique expression code instead of actual image or icon, to save network bandwidth and reduce amount of data transmitted, via the communication network 106. The first graphical emotion indicator (such as the first graphical emotion indicator 136*a*) may be displayed within the first face coordinates on the second image-capture device 102*b* based on the display instruction. The first graphical emotion indicator displayed within the first face coordinates may be a reference for the second user 108*b* indicative of a first emotional state and/or face deformation, such as a pout face, of the first user 108*a*, to allow the second user 108*b* (who may be at a remote location) to pose in a second emotional state and/or face deformation similar to the first emotional state or face deformation of the first user 108*a*.

At 326, the second self-portrait image 110*b* and second face coordinates of second user 108*b* may be received from the second image-capture device 102*b* based on communicated first notification message. The image processor 202 may be configured to receive the second self-portrait image 110*b* and the second face coordinates of second user 108*b*, via the network interface 210. In accordance with an embodiment, a confirmation message that the second image-capture device 102*b* has captured the second self-portrait image 110*b*, may be received. The confirmation message may include the second self-portrait image 110*b* and the second face coordinates of the second user 108*b*.

At 328, a second face size of the second user 108*b* may be adjusted in accordance with a first face size of the first user 108*a* in the first self-portrait image 110*a*, based on the first face coordinates and the received second face coordinates. The adjustment is done by face normalization on a portion of the second self-portrait image 110*b*. The portion of the second self-portrait image 110*b*, in which the facial region of the second user 108*b* is detected, may be normalized by the face normalization. The image normalizer 206 may be configured to adjust, by face normalization on the portion of the second self-portrait image 110*b*, the second face size of the second user 108*b* in accordance with the first face size of the first user 108*a* in the first self-portrait image 110*a*. The image normalizer 206, by applying the face normalization operation, may determine and compare the resolution, face size, and brightness properties of both the facial regions of the first user 108*a* and the second user 108*b*. Thereafter, at one of the facial regions (such as the portion that includes the facial region of the second user 108*b* in the second self-portrait image 110*b*) is processed and modified such that both the facial regions of the first user 108*a* and the second user 108*b* appear to be of similar sizes, resolution, and of same brightness properties.

At 330, a second height level of the second face coordinates may be adjusted in accordance with a first height level of the first face coordinates, by the height normalization on the portion of the second self-portrait image 110*b*. The image normalizer 206 may be configured to adjust, by height normalization on the portion of the second self-portrait image 110*b*, a second height level of the second face coordinates in accordance with a first height level of the first face coordinates of the first user 108*a*. The image normalizer 206 may be configured to compute a first distance between an upper edge of the first face rectangle 124*a* using the first face coordinates (obtained based on the face detection of first user 108*a*) and the top boundary of the first self-portrait image 110*a* after face normalization. The top boundary corresponds to an image boundary above the facial region of the first user 108*a* in the first self-portrait image 110*a*. Similar to the first distance computation in the first self-portrait image 110*a*, the image normalizer 206 may be configured to compute a second distance between an upper edge of the second face rectangle 124*b* using the second face coordinates (obtained based on the face detection of second user 108*b*) and the top boundary of the second self-portrait image 110*b*. Thereafter, the image normalizer 206 may be configured to position a portion (portion that includes a foreground region of the second user 108*b*) of the second self-portrait image 110*b* in the same position as of the computed first distance. In other words, one of the facial regions (such as the portion 130 that includes the facial region of the second user 108*b* in the second self-portrait image 110*b*) is positioned such that both the facial regions of the first user 108*a* and the second user 108*b* appear to be at a same or similar height. An example of height normalization 128*a* is shown in FIG. 1F.

At 332, a first output image may be generated, in which the portion 130 of the second self-portrait image 110*b* may be overlaid on the background region 132 of the selected background of the first self-portrait image 110*a* of the first user 108*a* in the first image composition 128. The first output image, such as a composite selfie, may be generated by the image processor 202 based on at least the face normalization. In some embodiments, the first output image may be generated by the image processor 202 based on the face normalization and the height normalization. An example of the first output image, such as the first self-portrait image 110*a* as a composite selfie, generated based on the face normalization 128*b* and the height normalization 128*a*, is shown in FIG. 1F.

At 334, it may be determined whether the count of desired users selected via the first application 112*a*, to whom further requests for selfie are to be send, greater than one. The image processor 202 may be configured to determine whether the count of desired users selected via the first application 112*a*, to whom further requests for selfie are to be sent, is greater than one. In cases where the count of desired users selected is equal to one, such as the second user 108*b*, the control may pass to end 346, else to 336 (FIG. 3C).

At 336, a second notification message may be communicated to the third image-capture device 102c associated with the third user 108c. The image processor 202 may be configured to communicate the second notification message (such as the second notification message 134, FIG. 1G) to the third image-capture device 102c associated with the third user 108c. The second notification message may include a request to capture the third self-portrait image 110c of the third user 108c, the user-identifier of the first user 108a, the first face coordinates of the first user 108a, and the received second face coordinates of the second user 108b. The first face coordinates and the second face coordinates are displayed on the third image-capture device 102c as a reference before capture of the third self-portrait image 110c of the third user 108c. The reference is indicative of a position of the face of the first user 108a and the second user 108b relative to the third face coordinates of the third user 108c at the time of capture of the third self-portrait image 110c. An example of the reference to indicate the position of the face of the first user 108a and the second user 108b (the remote users) by display of additional face rectangles 124a and 124b, at the time of capture of the third self-portrait image 110c, is shown and described in FIG. 1H. Similar to the second image-capture device 102b, a display instruction may also be communicated to the third image-capture device 102c to control display of the first graphical emotion indicator (such as the first graphical emotion indicator 136a) displayed within the first face coordinates and a second graphical emotion indicator (such as the second graphical emotion indicator 136b) within the second face coordinates. The displayed first graphical emotion indicator and the second graphical emotion indicator may serve as a reference for the third user 108c to pose similar to the emotional states and/or face deformations of the first user 108a and/or the second user 108b.

At 338, the third self-portrait image 110c and the third face coordinates of the third user 108c may be received from the third image-capture device 102c based on the communicated second notification message. The image processor 202 may be configured to receive the third self-portrait image 110c and the third face coordinates of the third user 108c from the third image-capture device 102c.

At 340, face normalization and height normalization may be executed on a portion of the third self-portrait image 110c, based on the first face coordinates, the second face coordinates, and the third second face coordinates. The image normalizer 206 may be configured to execute the face normalization 140b and the height normalization 140a (FIG. 1I) on a portion (such as the portion 142) of the third self-portrait image 110c, based on the first face coordinates, the second face coordinates, and the third second face coordinates.

At 342, a second output image may be generated in which the portion 130 of the second self-portrait image 110b and the portion 142 of the third self-portrait image 110c are concurrently overlaid on the background region 132 of the selected background of the first self-portrait image 110a in the second image composition 140, based on the face normalization 140b and the height normalization 140a. The image processor 202 may be configured to automatically generate the second output image, such as a composite selfie comprising the users 108a, 108b, and 108c.

At 344, it may be determined whether the count of received self-portrait images is equal to the count of desired users selected via the first application 112a. The image processor 202 may be configured to determine whether the count of received self-portrait images (such as the second self-portrait image 110b and the third self-portrait image 110c) is equal to the count of desired users (such as the second user 108b and the third user 108c) selected via the first application 112a. In cases where the count of received self-portrait images is less than the count of desired users selected via the first application 112a, the control may return to 336 to communicate another notification message to a next image-capture device. In cases where the count of received self-portrait images is equal to the count of desired users selected via the first application 112a, the control may pass to end 346.

In accordance with an embodiment of the disclosure, a device (e.g. the first image-capture device 102a) for composite selfie image composition for remote users, is disclosed. The device, such as the first image-capture device 102a (FIG. 1A), may comprise at least one image processor (such as the image processor 202 (FIG. 2)) and the memory 204 (FIG. 2). The memory 204 may be configured to store the first self-portrait image 110a of the first user 108a associated with the first image-capture device 102a along with first face coordinates of the first user 108a. The first self-portrait image 110a may include a selected background. The image processor 202 may be configured to communicate a first notification message to the second image-capture device 102b associated with the second user 108b. The first notification message may include a request to capture the second self-portrait image 110b of the second user 108b, a user-identifier of the first user 108a and the first face coordinates of the first user 108a. The image processor 202 may be further configured to receive the second self-portrait image 110b and second face coordinates of the second user 108b from the second image-capture device 102b based on the communicated first notification message. The image processor 202 may be further configured to adjust, by face normalization on the portion 130 of the second self-portrait image 110b, a second face size of the second user 108b in accordance with a first face size of the first user 108a. The adjustment by face normalization may be done based on the first face coordinates and the second face coordinates. The image processor 202 may be further configured to generate a first output image in which the portion 130 of the second self-portrait image 110b may be overlaid on the background region 132 of the selected background of the first self-portrait image 110a of the first user 108a in the first image composition 128. The first output image may be generated based on at least the face normalization.

In some embodiments, the first image-capture device 102a may specify a total time limit to generate the first output image, such as a composite selfie, for a selected number of users. The selected number of users may also be referred to as authorized users. In some embodiments, if the operations related to the generation of the first output image is completed within the specified total time limit, and additional time is remaining, a notification message to try the "distant selfie" feature may also be send to certain other users, which may be referred to as unauthorized participants or previously non-selected participants.

Various embodiments of the disclosure may provide a non-transitory computer readable medium and/or storage medium, where there is stored therein, a set of instructions executable by a machine and/or a computer for composite selfie image composition for remote users. The set of instructions may cause the machine and/or computer to store the first self-portrait image 110a of the first user 108a associated with the first image-capture device 102a along with first face coordinates of the first user 108a in the memory 204. The first self-portrait image 110a may include a selected background. A first notification message may be communicated to the second image-capture device 102b associated with the second user 108b. The first notification message may include a request to capture the second self-portrait image 110b of the second user 108b, a user-identifier of the first user 108a and the first face coordinates of the first user 108a. The second self-portrait image 110b and second face coordinates of the second user 108b may be received from the second image-capture device 102b based on the communicated first notification message. By face normalization on the portion 130 of the second self-portrait image 110b, a second face size of the second user 108b may be adjusted in accordance with a first face size of the first user 108a. The adjustment by face normalization may be done based on the first face coordinates and the second face coordinates. A first output image may be generated in which the portion 130 of the second self-portrait image 110b may be overlaid on the background region 132 of the selected background of the first self-portrait image 110a of the first user 108a in the first image composition 128. The first output image may be generated based on at least the face normalization.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A first image-capture device, comprising:
   a memory configured to store:
      a first self-portrait image of a first user associated with said first image-capture device, and
      first face coordinates of said first user, wherein said first self-portrait image includes a selected background; and
   an image processor configured to:
      detect a facial expression of said first user based on capture of said first self-portrait image of said first user;
      communicate a first notification message to a second image-capture device associated with a second user, wherein said first notification message includes:
         a request to capture a second self-portrait image of said second user,
         a user-identifier that identifies said first user, and
         said first face coordinates of said first user;
      communicate a display instruction of a first graphical emotion indicator to said second image-capture device via said first notification message, wherein
         said first graphical emotion indicator is indicative of said facial expression of said first user,
         said first graphical emotion indicator is displayed within said first face coordinates on said second image-capture device based on said display instruction, and
         said first graphical emotion indicator displayed within said first face coordinates is a first reference indicative of a first emotional state of said first user;
      receive said second self-portrait image and second face coordinates of said second user from said second image-capture device based on said communicated first notification message and said display instruction;
      adjust, by face normalization on a portion of said second self-portrait image, a second face size of said second user based on a first face size of said first user;
      adjust, by height normalization on said portion of said second self-portrait image, a second height level of said second face coordinates based on a first height level of said first face coordinates; and
      generate a first output image based on said face normalization and said height normalization, wherein said first output image comprises said portion of said second self-portrait image overlaid on a background region of said selected background of said first self-portrait image of said first user in a first image composition.

2. The first image-capture device according to claim 1, wherein said image processor is further configured to detect said first face coordinates of said first user based on said capture of said first self-portrait image of said first user.

3. The first image-capture device according to claim 2, wherein
   said image processor is further configured to tag a first region inside said first face coordinates and a second region located vertically below said first face coordinates as a foreground region, and
   a third region that excludes said foreground region in said first self-portrait image is tagged as said background region.

4. The first image-capture device according to claim 1, wherein
   said memory is further configured to store a plurality of background images; and
   said image processor is further configured to substitute a first background of said first self-portrait image with a second background, based on a selection of a background image from said stored plurality of background images.

5. The first image-capture device according to claim 1, wherein
said memory is further configured to store an application; and
said image processor is further configured to receive an input to select a distant-selfie mode via said stored application to initiate a first output image generation process.

6. The first image-capture device according to claim 1, wherein
said image processor is further configured to:
communicate a second notification message to a third image-capture device associated with a third user, wherein said second notification message includes:
said request to capture a third self-portrait image of said third user,
said user-identifier of said first user,
said first face coordinates of said first user, and
said second face coordinates of said second user,
said first face coordinates and said second face coordinates are displayed on said third image-capture device as a second reference based on said capture of said third self-portrait image of said third user, and
said second reference is indicative of a position of said first user and said second user relative to third face coordinates of said third user in said third self-portrait image.

7. The first image-capture device according to claim 6, wherein said image processor is further configured to receive said third self-portrait image and said third face coordinates of said third user from said third image-capture device based on said communicated second notification message.

8. The first image-capture device according to claim 6, wherein said image processor is further configured to execute said face normalization and said height normalization on a portion of said third self-portrait image based on said first face coordinates, said second face coordinates, and said third face coordinates.

9. The first image-capture device according to claim 8, wherein
said image processor is further configured to generate a second output image based on said face normalization and said height normalization,
said second output image comprises said portion of said second self-portrait image and said portion of said third self-portrait image concurrently overlaid on said background region of said selected background of said first self-portrait image of said first user in a second image composition.

10. An image-processing method, comprising:
in a first image-capture device that includes a memory and an image processor:
storing, by said memory:
a first self-portrait image of a first user associated with said first image-capture device, and
first face coordinates of said first user, wherein said first self-portrait image includes a selected background; and
detecting a facial expression of said first user based on capture of said first self-portrait image of said first user;
communicating, by said image processor, a first notification message to a second image-capture device associated with a second user, wherein said first notification message includes:
a request to capture a second self-portrait image of said second user,
a user-identifier that identifies said first user, and
said first face coordinates of said first user;
communicating a display instruction of a first graphical emotion indicator to said second image-capture device via said first notification message, wherein
said first graphical emotion indicator is indicative of said facial expression of said first user,
said first graphical emotion indicator is displayed within said first face coordinates on said second image-capture device based on said display instruction, and
said first graphical emotion indicator displayed within said first face coordinates is a reference indicative of a first emotional state of said first user;
receiving, by said image processor, said second self-portrait image and second face coordinates of said second user from said second image-capture device based on said communicated first notification message and said display instruction;
adjusting, by said image processor, by face normalization on a portion of said second self-portrait image, a second face size of said second user based on a first face size of said first user;
adjusting, by height normalization on said portion of said second self-portrait image, a second height level of said second face coordinates based on a first height level of said first face coordinates; and
generating, by said image processor, a first output image based on at least said face normalization and said height normalization, wherein said first output image comprises said portion of said second self-portrait image overlaid on a background region of said selected background of said first self-portrait image of said first user in a first image composition.

11. The method according to claim 10, further comprising detecting, by said image processor, said first face coordinates of said first user based on said capture of said first self-portrait image of said first user.

12. The method according to claim 10, further comprising tagging, by said image processor, a first region inside said first face coordinates and a second region located vertically below said first face coordinates as a foreground region, wherein a third region excluding said foreground region in said first self-portrait image is tagged as said background region.

13. The method according to claim 10, further comprising:
storing, by said memory, a plurality of background images; and
substituting, by said image processor, a first background of said first self-portrait image with a second background, based on a selection of a background image from said stored plurality of background images stored in said memory.

14. The method according to claim 10, further comprising:
storing, said memory, an application; and
receiving, by said image processor, an input to select a distant-selfie mode via said stored application to initiate a first output image generation process.

* * * * *